(12) United States Patent
Kotalwar et al.

(10) Patent No.: US 8,369,332 B2
(45) Date of Patent: Feb. 5, 2013

(54) SERVER-SIDE LOAD BALANCING USING PARENT-CHILD LINK AGGREGATION GROUPS

(75) Inventors: Jayant Kotalwar, Sunnyvale, CA (US); Venugopal Hemige, Union City, CA (US)

(73) Assignee: Alcatel Lucent, Paris (FR)

( * ) Notice: Subject to any disclaimer, the term of this patent is extended or adjusted under 35 U.S.C. 154(b) by 701 days.

(21) Appl. No.: 12/545,680

(22) Filed: Aug. 21, 2009

(65) Prior Publication Data

US 2011/0044339 A1    Feb. 24, 2011

(51) Int. Cl.
*H04L 12/28* (2006.01)
(52) U.S. Cl. .......... 370/392; 370/254; 709/224
(58) Field of Classification Search .......... 370/392, 370/254, 509; 709/224, 227
See application file for complete search history.

(56) References Cited

U.S. PATENT DOCUMENTS

| | | | | |
|---|---|---|---|---|
| 6,553,029 | B1* | 4/2003 | Alexander | 370/389 |
| 2008/0151890 | A1* | 6/2008 | Zelig et al. | 370/390 |
| 2008/0298236 | A1* | 12/2008 | Ervin et al. | 370/232 |
| 2009/0016383 | A1* | 1/2009 | Suzuki et al. | 370/509 |
| 2010/0157844 | A1* | 6/2010 | Casey et al. | 370/254 |

OTHER PUBLICATIONS

IEEE Computer Society, IEEE Standard for Local and Metropolitan area networks, "Link Aggregation", IEEE Std 802.1AX, NY, NY Nov. 2008.
Bocci M et al. "Networking high availability for ethernet services using IP/MPLS networks", IEEE Communications Magazine, IEEE Service Center Piscataway, US, vol. 45, No. 3, Mar. 1, 2008 pp. 90-96.z.
Rathgeb, E. P. "The mainStreetXpress 36190: a scalable and highly reliable ATM core services switch" Computer Networks, Elsevier Science Publishers B. V., Amsterdam, NL LNKD-DOI:10.1016/S0169-7552(98)00283-9 vol. 31, No. 6, Mar. 25, 1999, pp. 583-601.

* cited by examiner

*Primary Examiner* — Robert Wilson
*Assistant Examiner* — Wei Zhao
(74) *Attorney, Agent, or Firm* — Kramer & Amado P.C.

(57) ABSTRACT

Various exemplary embodiments relate to a method and related network node including one or more of the following: establishing, at the network node, a first Child Link Aggregation Group (CLAG), wherein the first CLAG includes at least one link to a first downstream node; establishing, at the network node, a second CLAG, wherein the second CLAG includes at least one link to a second downstream node; establishing, at the network node, a Parent Link Aggregation Group (PLAG), wherein the PLAG includes the first CLAG and the second CLAG; receiving, at the network node, a packet including an address of a destination of the packet; determining that the destination of the packet is associated with the PLAG; and transmitting the packet over both the first CLAG and the second CLAG.

20 Claims, 6 Drawing Sheets

| | 310 | 320 | 330 |
|---|---|---|---|
| | IP Address | MAC Address | TTL |
| 340 | A | U | 21:12:00 |
| 350 | B | U | 09:01:25 |
| 360 | C | U | 00:51:50 |
| 370 | ... | ... | ... |

*FIG. 3*

| | 410 | 420 |
|---|---|---|
| | CLAG Address | Link Addresses |
| 430 | U | {U;V} |
| 440 | W | {W;X;Y} |
| 450 | Z | {Z} |
| 460 | ... | ... |

*FIG. 4*

| | 510 | 520 |
|---|---|---|
| | PLAG Address | CLAG Addresses |
| 530 | U | {U;W;Z} |
| 540 | ... | ... |

| Index | Server ID |
|---|---|
| 0 | A |
| 1 | B |
| 2 | C |
| ... | ... |

SERVER-SIDE LOAD BALANCING USING PARENT-CHILD LINK AGGREGATION GROUPS

TECHNICAL FIELD

Various exemplary embodiments disclosed herein relate generally to the routing of packets in a communications network and the balancing of server load.

BACKGROUND

In many client-server applications, such as IP Television (IPTV), the number of clients requesting a particular service can be quite large. Because any computer has finite processing capability, a server may only provide service to a limited number of clients before the quality of service degrades to unacceptable levels. The most obvious solution, simply providing faster server components, can become prohibitively expensive and technologically impossible as the number of active clients increases. Accordingly, many client-server applications provide multiple redundant servers in order to accommodate all client requests. Various forms of load balancing are then employed to ensure that no single server becomes too bogged down in serving client requests.

In a rudimentary form of load balancing, multiple servers may be provided and the client may simply choose one server to process a request. This can be seen in applications such as file mirroring, where a list of multiple computers serving the requested file are presented to a user, who then simply picks a server to download from. Other information may be provided, such as the current status or geographic location of the server, but the onus is on the user to process this information and make an informed server selection. If the chosen server does not provide the quality of service expected by the client, a different server may be selected.

In another form of server load balancing, a client may send multiple requests to multiple servers and simply accept the first response that arrives, discarding any later arriving responses. Again, this requires more work on the part of the client, as the request must be duplicated and transmitted to multiple addresses. A multicast protocol may be used to send a single request to multiple destinations, but again, this method places the burden on the client, the servers and the network. The server(s) would need to know each client it serves and join a multicast group hosted by the client. This is not practical.

In a more advanced form of load balancing, a central server may arbitrate from which server a client will receive service. According to this method, a client may send its request to a central server which will then determine an appropriate working server to provide service to the client. The central server may then either respond to the client with the address of the assigned working server or hand the initial request directly to the working server. Thus, this method can require the client to perform unnecessary session establishment and exposes the client to at least a portion of the inner workings of the server system. This method may also carry the added disadvantage of leaving server system more vulnerable to attacks such as, for example, a denial of service attack.

Additionally, a central server would have the same limits as any other computing system and may likewise receive too many establishment requests to process efficiently. Thus, in particularly high client volume applications, multiple central servers may be required and the problem becomes recursive. Another form of load balancing must then be implemented in order to ensure that no central server receives more requests than it can efficiently process.

Accordingly, there exists a need for a method of balancing server load between multiple servers without needlessly complicating the methods performed by client devices in requesting a service. Additionally, a need exists for a method to balance server load in a manner that is virtually invisible to client devices.

Another possible point of failure for any network system is in the links connecting network nodes. IEEE 802.1AX, which is incorporated herein by reference, provides for link aggregation groups (LAGS) that combat this possibility. A LAG is made up of multiple links between the same two nodes. When sending a packet over a LAG, a sending node simply selects one of the links that make up the LAG and transmits the packet over one of the selected link. A LAG is given an identifier such as the MAC address of one of its constituent links. In this manner, a packet may be transmitted over one of multiple links toward its destination in a manner that is virtually invisible to all devices other than the two devices at either end of the LAG. If one link fails, packets may still be transmitted over the remaining links in the LAG.

While effective in combating link failure and increasing transfer speeds, LAGs are not useful for many other problems. The operation of a LAG is very simple and not highly customizable. Thus, LAGs are not particularly helpful when devising new and creative methods of fixing network problems and increasing performance. Accordingly, there exists an additional need for a LAG implementation allowing a higher degree of functionality and customization.

The foregoing objects and advantages of the invention are illustrative of those that can be achieved by the various exemplary embodiments and are not intended to be exhaustive or limiting of the possible advantages that can be realized. Thus, these and other objects and advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

SUMMARY

In light of the present need for a method of balancing server load between multiple redundant servers in a manner that is virtually invisible to client devices, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method and related network node including one or more of the following: establishing, at the network node, a first Child Link Aggregation Group (CLAG), wherein the first CLAG includes at least one link to a first downstream node; establishing, at the network node, a second CLAG, wherein the second CLAG includes at least one link to a second downstream node; establishing, at the network node, a Parent Link Aggregation Group (PLAG), wherein the PLAG includes the first CLAG and the second CLAG; receiving, at the network node, a packet including an address of a destination of the packet; determining that the destination of the packet is associated with the PLAG; and transmitting the packet over both the first CLAG and the second CLAG.

It should be apparent that, in this manner, various exemplary embodiments enable the routing of any packet to each of a group of servers and the determination of which server should process and/or respond to a received packet. In particular, by sending a packet over every CLAG contained in a PLAG, each server connected to such a CLAG will receive a copy of the packet. Thus, various exemplary embodiments enable the transmission of a packet to multiple servers in a manner that is virtually invisible to the client devices.

BRIEF DESCRIPTION OF THE DRAWINGS

In order to better understand various exemplary embodiments, reference is made to the accompanying drawings, wherein.

DETAILED DESCRIPTION

Referring now to the drawings, in which like numerals refer to like components or steps, there are disclosed broad aspects of various exemplary embodiments. It should be noted that, while various examples utilize letters to signify various network addresses, these letters serve as placeholders and, in actual operation, valid network addresses formed according to appropriate standards would likely be present. In addition, while various embodiments are described herein as routing IP packets specifically, the present disclosure is in no way limited to this protocol.

Figure 1:
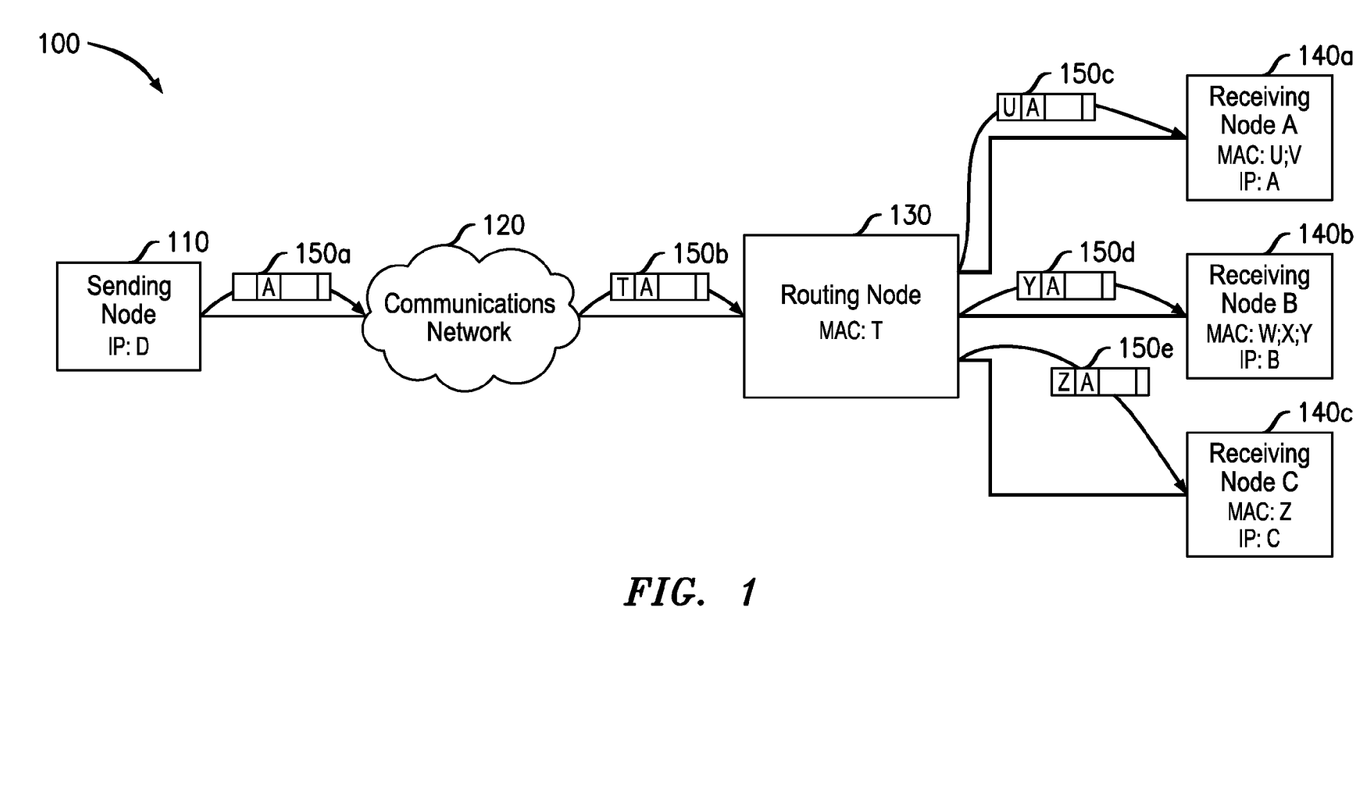
FIG. 1 is a schematic diagram of an exemplary network for routing a unicast or multicast packet to multiple servers.

FIG. 1 is a schematic diagram of an exemplary network 100 for routing a unicast or multicast packet to multiple servers. Exemplary network 100 may include a sending node 110, a communications network 120, a routing node 130, and a number of receiving nodes 140a, 140b, 140c.

Sending node 110 may be a device that communicates with receiving nodes 140a, 140b, 140c. Sending node 110 may, for example, act as a client device and provide a user with access to a service that may be provided by receiving nodes 140a, 140b, 140c. More specifically, in various exemplary embodiments, sending node 110 is a personal or laptop computer, wireless email device, cell phone, television set-top box, or any other device capable of sending a packet to another network device. Sending node 110 may be associated with an IP address, such as "D." Sending node 110 may also be associated with a MAC address.

Communications network 120 may be any network for providing data communications between sending node 110 and router node 130. Communications network 120 may be packet-switched or circuit-switched. Further, communications network 120 may provide, for example, phone and Internet service to various user devices in communication with communications network 120.

Routing node 130 may be a device that receives and retransmits packets according to their destination address. More specifically, in various exemplary embodiments, routing node 130 is a packet router, network switch, multilayer switch, server, or any other device capable of reading an address and forwarding a packet over a port associated with the address. Routing node 130 may be associated with at least one MAC address, "T." while it is likely that routing node 130 is associated with multiple MAC addresses, for simplicity, T will be used herein to refer to any appropriate MAC address of the MAC addresses associated with routing node 130.

Receiving nodes A-C 140a, 140b, 140c may be network devices that communicate with sending node 110. Receiving nodes A-C 140a, 140b, 140c may be server devices that provide a service to user node 110 such as, for example, IP television or file access. More specifically, in various exemplary embodiments, each of receiving nodes A-C 140a, 140b, 140c may be a server, a personal or laptop computer, wireless email device, cell phone, television set-top box, or any other device capable of receiving a packet from another network device.

Receiving node A 140a may be associated with an IP address A and a number of MAC addresses, such as U and V. Receiving node B, 140b may be associated with an IP address B and a number of MAC addresses, such as W, X, and Y. Receiving node C, 140c may be associated with an IP address C and a number of MAC addresses, such as Z. It should be apparent that each of receiving nodes A-C 140a, 140b, 140c, may have any number of network interfaces and thus any number of MAC addresses, including a single MAC address, as is the case with exemplary receiving node C 140c. Receiving nodes A-C 140a, 140b, 140c may include additional network interfaces that are not coupled to routing node 130, but for the purposes of the examples described herein, MAC addresses U, V, W, X, Y, and Z are each associated with network interfaces connected to routing node 130.

Having described the components of network 100, a brief summary of the operation of network 100 will be provided. It should be apparent that the following description is intended to provide an overview of the operation of network 100 and is therefore a simplification in some respects. The detailed operation of network 100 will be described in further detail below in connection with FIGS. 2-5 and 8.

According to various exemplary embodiments, sending node may transmit a packet over communications network 120. The packet may be addressed to IP address A (i.e., the IP address associated with receiving node A 140a) and may be carried inside a frame 150a to the next device within communications network 120. Routing node 130 may then receive the packet inside a frame 150b addressed to MAC address T. In determining over which port the packet should be forwarded, routing node 130 may read the IP address of the packet and consult its configuration to determine how to process the packet. In this example, routing node 130 may determine that it has been configured to transmit packets addressed to IP address A to all three of the receiving nodes

140a, 140b, 140c. Routing node 130 may then select a link over which to transmit the packet to receiving node A 140a, a link over which to transmit the packet to receiving node B 140b, and a link over which to transmit the packet to receiving node C 140c. Finally, routing node 130 may transmit a frame 150c to the interface with MAC address U, a frame 150d to the interface with MAC address Y, and a frame 150e to the interface with MAC address Z.

Thus, the packet sent by sending node 110 to IP address A has been received at each receiving node 140a, 140b, 140c without special action on the part of sending node 110. Receiving nodes 140a, 140b, 140c are now free to determine which, if any, of the receiving nodes 140a, 140b, 140c should respond to the packet. An exemplary method for determining which node should respond to such a packet is described herein with reference to FIGS. 6-7 and 9. The process may be similar for various embodiments that are not specifically tied to IP. In these embodiments, the payload of the frame received by routing node 130, whatever it is, may be transmitted to each of the receiving nodes 140a, 140b, 140c.

Figure 2:
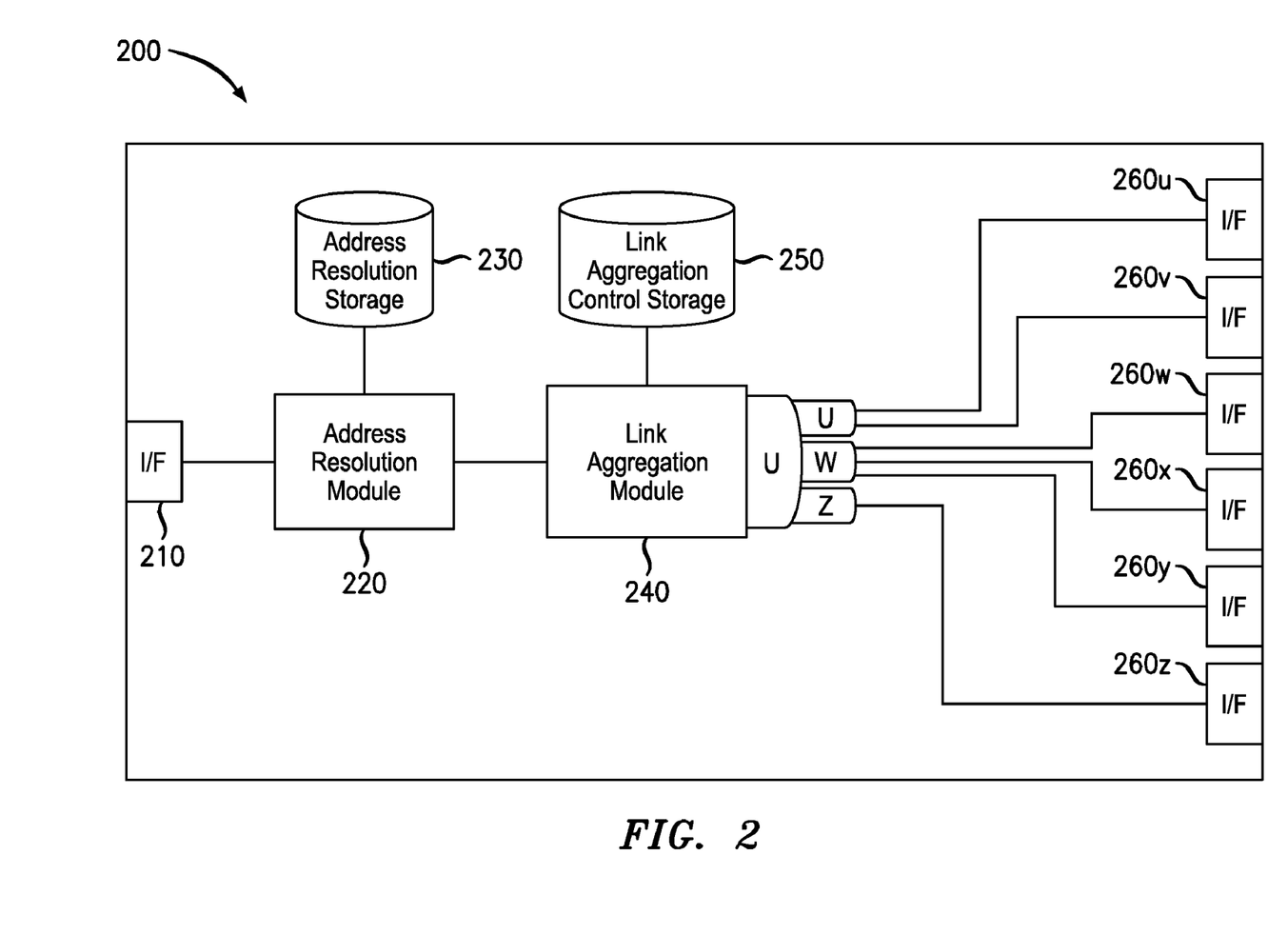
FIG. 2 is a schematic diagram of an exemplary routing node for routing a unicast or multicast packet to multiple servers.

FIG. 2 is a schematic diagram of an exemplary routing node 200 for routing a unicast or multicast packet to multiple servers. Exemplary routing node 200 may correspond to routing node 130 and may include a first interface 210, an address resolution module 220, an address resolution storage 230, a link aggregation module 240, a link aggregation control storage 250, and a plurality of interfaces 260u-z.

Interface 210 may be an interface comprising hardware and/or executable instructions encoded on a machine-readable storage medium configured to transmit and receive data over communications network 120. Interface 210 may be coupled to another network device within communications network 120.

Address resolution module 220 may include hardware and/or executable instructions on a machine-readable storage medium configured to determine how to route a packet according to its destination address. For example, address resolution module 220 may receive a packet from interface 210 and read its destination address. Address resolution module 220 may then consult address resolution storage 230 to determine a next-hop address associated with the destination address. Address resolution module 220 may finally pass the packet to link aggregation module 240 so it may forward the packet according to the determined next-hop address.

Address resolution storage 230 may be any machine-readable medium capable of storing associations between destination addresses and identifiers used to route a packet. For example, address resolution storage 230 may be a table implemented according to the Address Resolution Protocol and thus provide associations between IP addresses and MAC addresses. An exemplary embodiment of the data stored in address resolution storage 230 is described in greater detail below with reference to FIG. 3.

Link aggregation module 240 may include hardware and/or executable instructions on a machine-readable storage medium configured to transmit a packet over an appropriate interface 260u-z. Link aggregation module 240 may implement at least one Parent Link Aggregation Group (PLAG) and constituent Child Link Aggregation Groups (CLAGs).

A CLAG may be configured to include one or more links to another network node. Each CLAG may be associated with a CLAG identifier. This CLAG identifier may be a unique identifier or it may be an identifier associated with one of the included links, such as its MAC address. In operation, when forwarding a packet over a CLAG, the link aggregation module 240 may select one of the links included in the CLAG and transmit the packet over only the selected link. In this manner, link redundancy is established and if one link in the CLAG fails, the remaining links may be used to communicate with the attached network node.

A PLAG may be configured to include multiple CLAGs. Each CLAG may connect to a different network node or the same network node. A PLAG may be associated with a PLAG identifier which may be a unique identifier or the same as the CLAG identifier for one of the included CLAGs. In operation, when forwarding a packet over a PLAG, the link aggregation module 240 may forward the packet over each constituent CLAG. The packet may then be forwarded according to the normal operation of the constituent CLAGs, as described above. Thus, a packet forwarded over a PLAG will be sent over one link from each constituent CLAG. When each CLAG connects to a different network node, each network node will receive one copy of the packet and can then process it accordingly.

According to the exemplary embodiment in FIG. 2, routing node 200 is configured with one PLAG and three CLAGs. A first CLAG has SAC address U as an identifier and includes interfaces 260u, 260v. A second CLAG has MAC address W as an identifier and includes interfaces 260w, 260x, 260y. A third CLAG has MAC address Z as an identifier and includes interface 260z. The PLAG has MAC address U as an identifier and includes CLAG U, CLAG W, and CLAG Z.

Link aggregation control storage 250 may be any machine-readable medium capable of storing the configuration of various link aggregations groups. Link aggregation control storage 250 may, for example, contain the definitions of all PLAGs and CLAGs configured on routing node 200. Exemplary embodiments of the data stored by link aggregation control storage 250 are described in further detail below with reference to FIGS. 4-5.

Interfaces 260u-z may each be an interface comprising hardware and/or executable instructions encoded on a machine-readable storage medium configured to transmit and receive data. Each interface 260u-z may be coupled to one of a plurality of network nodes. For example, interfaces 260u, 260v may be coupled to receiving node A 140a; interfaces 260w, 260x, 260y may be coupled to receiving node B 140b; and interface 260z may be coupled to receiving node C 140c.

Figure 3:
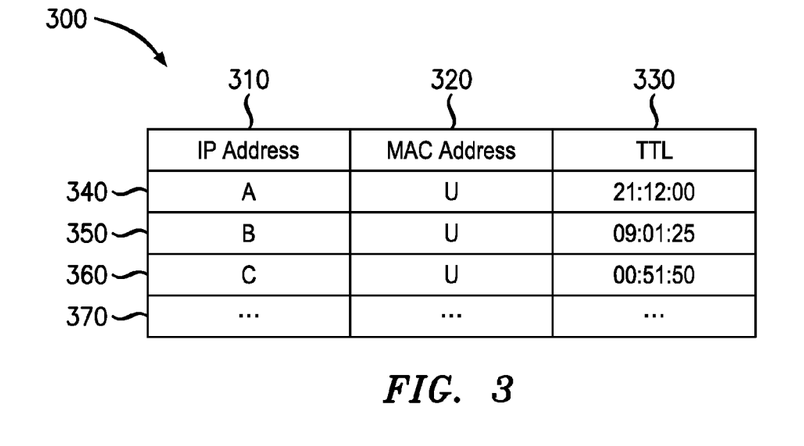
FIG. 3 is a schematic diagram of an exemplary data arrangement for storing data related to IP address resolution.

FIG. 3 is a schematic diagram of an exemplary data arrangement 300 for storing data related to IP address resolution. Data arrangement 300 may be, for example, a table in a database stored in address resolution storage 230. Alternatively, data arrangement 300 could be a series of linked lists, an array, or a similar data structure. Thus, it should be apparent that data arrangement 300 is an abstraction of the underlying data; any data structure suitable for storage of this data may be used.

Data arrangement 300 may include IP address field 310, corresponding MAC address field 320, and time to live (TTL) field 330. IP address field 310 may be used to indicate the IP address to which a particular record corresponds. MAC address field 320 may indicate a MAC address which should be used to route packets to the corresponding IP address. TTL field 330 may indicate when a particular record should be deleted from data arrangement 300.

As an example, record 340 indicates that packets destined for IP address A should be forwarded over the interface associated with MAC address U and that this mapping should live until 21:12:00, at which point record 340 may be deleted. Likewise, record 350 indicates that IP address B also maps to MAC address U and that the mapping should live until 09:01:25. Record 360 indicates that IP address C maps to MAC address U as well and that this mapping should live until 00:51:50. Data arrangement 300 may contain numerous additional records 370.

Figure 4:
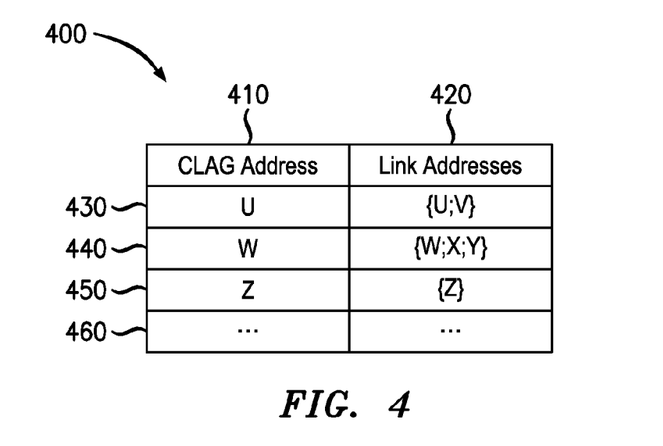
FIG. 4 is a schematic diagram of an exemplary data arrangement for storing Child Link Aggregation Group configurations.

FIG. 4 is a schematic diagram of an exemplary data arrangement 400 for storing CLAG configurations. Data arrangement 400 may be, for example, a table in a database stored in link aggregation control storage 250. Alternatively, data arrangement 400 could be a series of linked lists, an array, or a similar data structure. Thus, it should be apparent that data arrangement 400 is an abstraction of the underlying data; any data structure suitable for storage of this data may be used.

Data arrangement 400 may include CLAG address field 410 and link addresses field 420. CLAG address field 410 may indicate the CLAG identifier to which a CLAG record corresponds. Link addresses field 420 may indicate the MAC addresses that are associated with a particular CLAG address.

As an example, CLAG record 430 indicates that a CLAG is configured that has MAC address U as an identifier and includes the interfaces associated with MAC addresses U and V. Likewise, CLAG record 440 indicates that a CLAG is configured that has MAC address W as an identifier and includes the interfaces associated with MAC addresses W, X, and Y. Further, CLAG record 450 indicates that a CLAG is configured that has MAC address Z as an identifier and includes the interface associated with MC address Z. Data arrangement 400 may contain numerous additional CLAG records 460.

Figure 5:
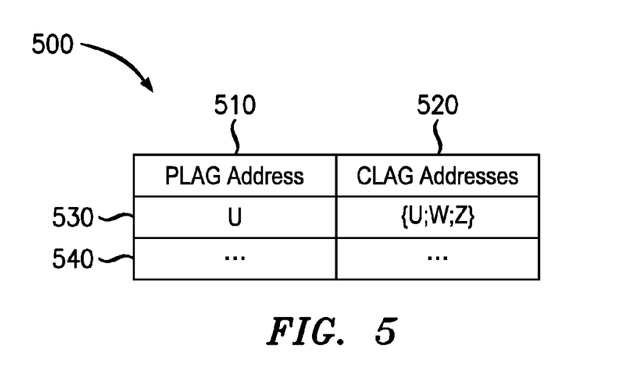
FIG. 5 is a schematic diagram of an exemplary data arrangement for storing Parent Link Aggregation Group configurations.

FIG. 5 is a schematic diagram of an exemplary data arrangement 500 for storing PLAG configurations. Data arrangement 500 may be, for example, a table in a database stored in link aggregation control storage 250. Alternatively, data arrangement 500 could be a series of linked lists, an array, or a similar data structure. Thus, it should be apparent that data arrangement 500 is an abstraction of the underlying data; any data structure suitable for storage of this data may be used.

Data arrangement 500 may include PLAG address field 510 and CLAG addresses field 520. PLAG address field 510 may indicate the PLAG identifier to which a PLAG record corresponds. CLAG addresses field 520 may indicate the CLAG identifiers that are associated with a particular PLAG address.

As an example, PLAG record 530 indicates that a PLAG is configured that has MAC address U as an identifier and includes the CLAGs identified by MAC addresses U, W, and Z. Data arrangement 500 may contain numerous additional PLAG records 540.

Figure 6:
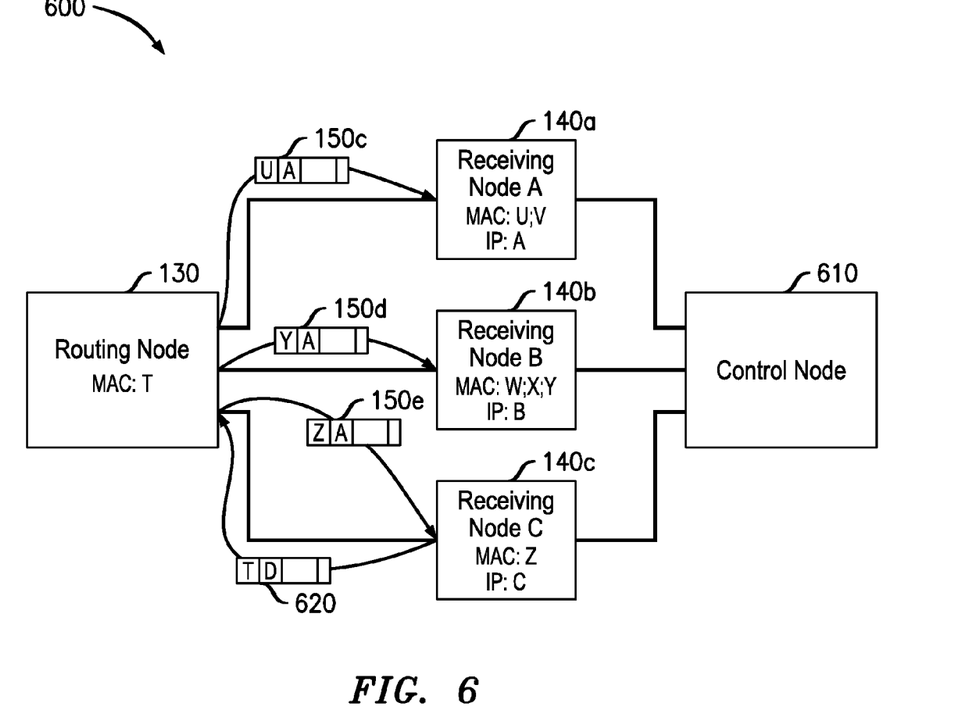
FIG. 6 is a schematic diagram of an exemplary network for performing load balancing between multiple servers.

FIG. 6 is a schematic diagram of an exemplary network 600 for performing load balancing between multiple servers 140*a*, 140*b*, 140*c*. Exemplary network 600 may include routing node 130, receiving nodes A-C 140A, 140B, 140C, and control node 610.

Control node 610 may be a network device capable of keeping receiving nodes 140*a*, 140*b*, 140*c* up-to-date as to which receiving nodes 140*a*, 140*b*, 140*c* are active. More specifically, in various exemplary embodiments, control node 610 may be a server, a personal or laptop computer, wireless email device, cell phone, television set top box, or any other device capable of communicating with each receiving node 140*a*, 140*b*, 140*c*. Control node 610 may maintain a list of active receiving nodes 140*a*, 140*b*, 140*c* and periodically communicate this list to receiving nodes 140*a*, 140*b*, 140*c*. Alternatively, control node 610 may only send messages to receiving nodes 140*a*, 140*b*, 140*c* when a receiving node 140*a*, 140*b*, 140*c* becomes active or inactive and receiving nodes 140*a*, 140*b*, 140*c* may then update locally-stored active server lists accordingly. As a further alternative, control node 610 may not be present at all and receiving nodes 140*a*, 140*b*, 140*c* may maintain local active server lists through periodic communications with each other.

Receiving nodes 140*a*, 140*b*, 140*c* may all implement an algorithm that uses a list of the currently active receiving nodes 140*a*, 140*b*, 140*c* to determine whether or not to process a received packet and respond accordingly. Thus, assuming each receiving node 140*a*, 140*b*, 140*c* contains a reference to all three receiving nodes 140*a*, 140*b*, 140*c* in their currently active server list, when receiving node A 140*a* receives frame 150*c*, it may use the common algorithm to determine that receiving node C 140*c* should respond to the packet. Accordingly, receiving node A 140*a* may ignore the packet. Likewise, when receiving node B 140*b* receives frame 150*d*, it may determine that receiving node C 140*c* should respond to the packet and ignore the packet as well. When receiving node C 140*c* receives frame 150*e*, it may determine that, according to the algorithm, it should process the packet and respond accordingly. Receiving node C 140*c* may therefore send a response packet addressed to IP address D (i.e., the IP address of sending node 110) and encapsulate it in a frame 620 addressed to MAC address T.

Figure 7:
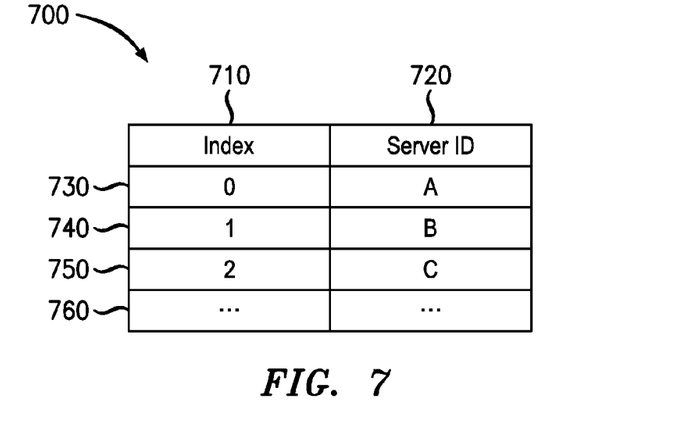
FIG. 7 is a schematic diagram of an exemplary data arrangement for storing an indexed list of currently active servers.

FIG. 7 is a schematic diagram of an exemplary data arrangement 700 for storing an indexed list of currently active servers. Data arrangement 700 may be, for example, a table in a database stored in one of the receiving nodes 140*a*, 140*b*, 140*c*. Alternatively, data arrangement 700 could be a series of linked lists, an array, or a similar data structure. Thus, it should be apparent that data arrangement 700 is an abstraction of the underlying data; any data structure suitable for storage of this data may be used.

Data arrangement 700 may include an index field 710 and a server ID field 720. Index field 710 may simply include a number corresponding to a specific record. Records may be accessed by specifying the index of the desired record. Server ID field 720 may include an identifier for one of the receiving nodes 140*a*, 140*b*, 140*c*. The identifier may be, for example, an IP address associated with the referenced receiving node 140*a*, 140*b*, 140*c*.

As an example, server record 730 may be indexed by the number zero and identify the node at IP address A (i.e., receiving node A 140*a*) as an active server. Likewise, server record 740 may be indexed by the number one and identify the node at IP address B (i.e., receiving node B 140*b*) as an active server. Server record 750 may be indexed by the number two and identify the node at IP address C (i.e., receiving node C 140*c*) as an active server. Data arrangement 700 may contain numerous additional records 760.

Figure 8:
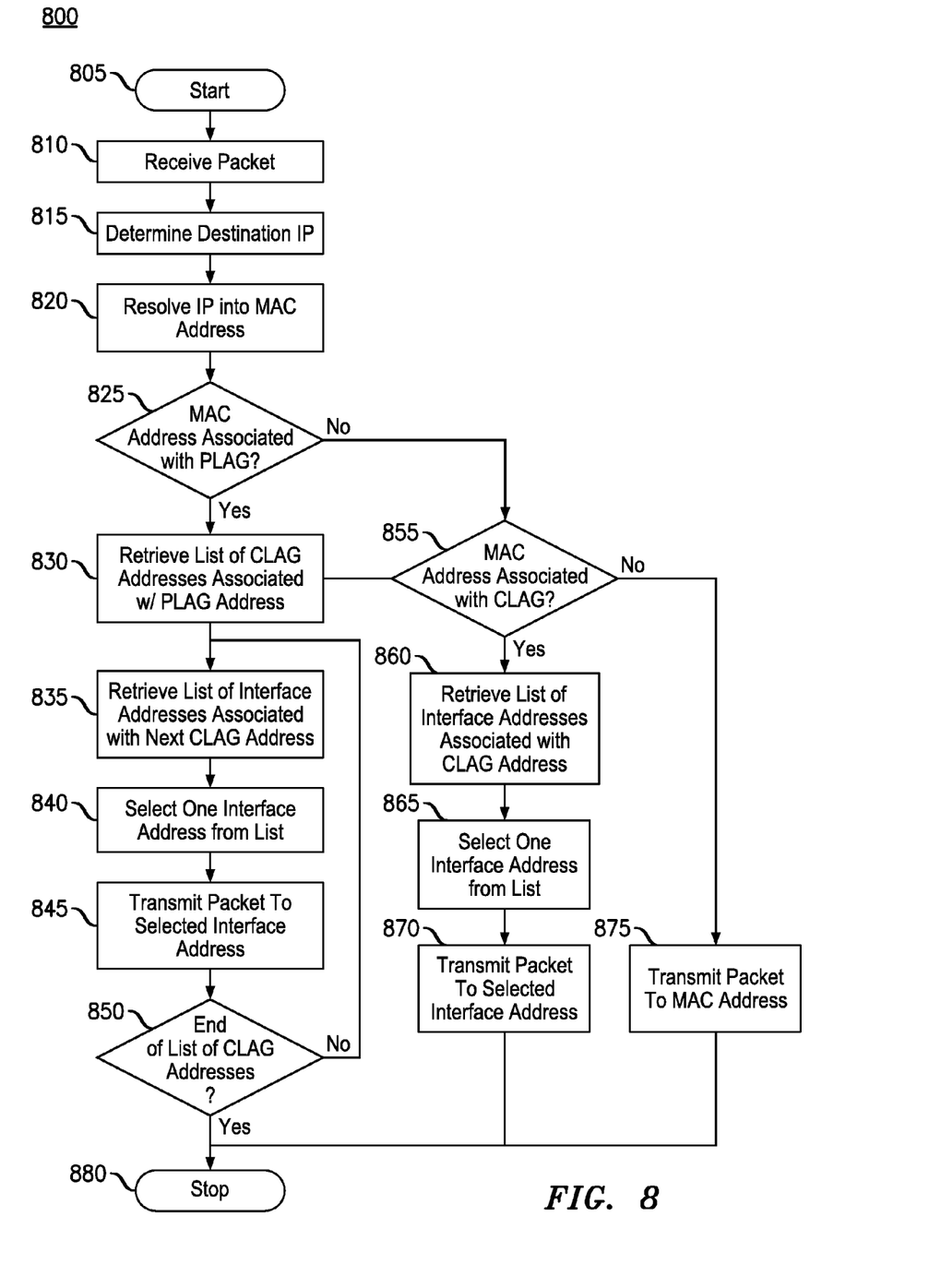
FIG. 8 is a flowchart of an exemplary method for routing a unicast or multicast packet to multiple servers.

FIG. 8 is a flowchart of an exemplary method 800 for routing a unicast or multicast packet to multiple servers. Method 800 may be performed by the components of routing node 130 to forward a packet to each of the receiving nodes 140*a*, 140*b*, 140*c*.

Method 800 starts in step 805 and proceeds to step 810, where routing node 130 receives a packet. Routing node 130 may then determine the destination IP address of the packet and resolve the destination IP address into an appropriate MAC address over which to forward the packet in steps 815 and 820, respectively. For example, routing node 130 may consult an address resolution storage 230 to determine a MAC address associated with the destination IP address. After determining an appropriate MAC address for forwarding the packet, routing node 130 may determine whether the MAC address is associated with a PLAG in step 825.

If the MAC address identifies a PLAG, method 800 may proceed to step 830, where routing node 130 may retrieve a list of CLAGs associated with the PLAG by, for example, accessing a PLAG record associated with the PLAG address in a link aggregation control storage 250. Routing node 130 may then retrieve a list of links associated with the first CLAG in the list of CLAGs at step 835 by, for example, accessing a CLAG record associated with the first constituent CLAG from a link aggregation control storage 250. Routing node 130 may then select one link from the list of links for the CLAG and transmit the packet to the selected link in steps 840 and 845, respectively. Method 800 may then proceed to step 850, where routing node 140 may determine whether it has reached the end of the list of CLAG addresses. If it has not, method 800 may return to step 835 where routing node 140 may repeat steps 835-850 for the next CLAG in the list. If the end of the list has been reached, method 800 may stop in step 880. In this manner, one copy of the received packet may be sent over each CLAG.

If it is determined at step 825 that the MAC address does not identify a PLAG, method 800 may move to step 855, where routing node 130 may determine whether the MAC address is instead associated with a CLAG. If so, routing node 130 may retrieve a list of links associated with the CLAG, select one link from the list, and transmit the packet to the selected link in steps 860, 865, and 870, respectively. Method 800 may then stop in step 880. In this manner, the routing node 130 may implement standard link aggregation functionality in addition to PLAG functionality.

If routing node 130 determines at step 855 that the MAC address is not associated with a CLAG, routing node 130 may assume that the packet may be routed according to standard operation. Method 800 may proceed to step 875 where routing node 130 may transmit the packet to the MAC address associated with the destination IP address and then stop in step 880.

Figure 9:
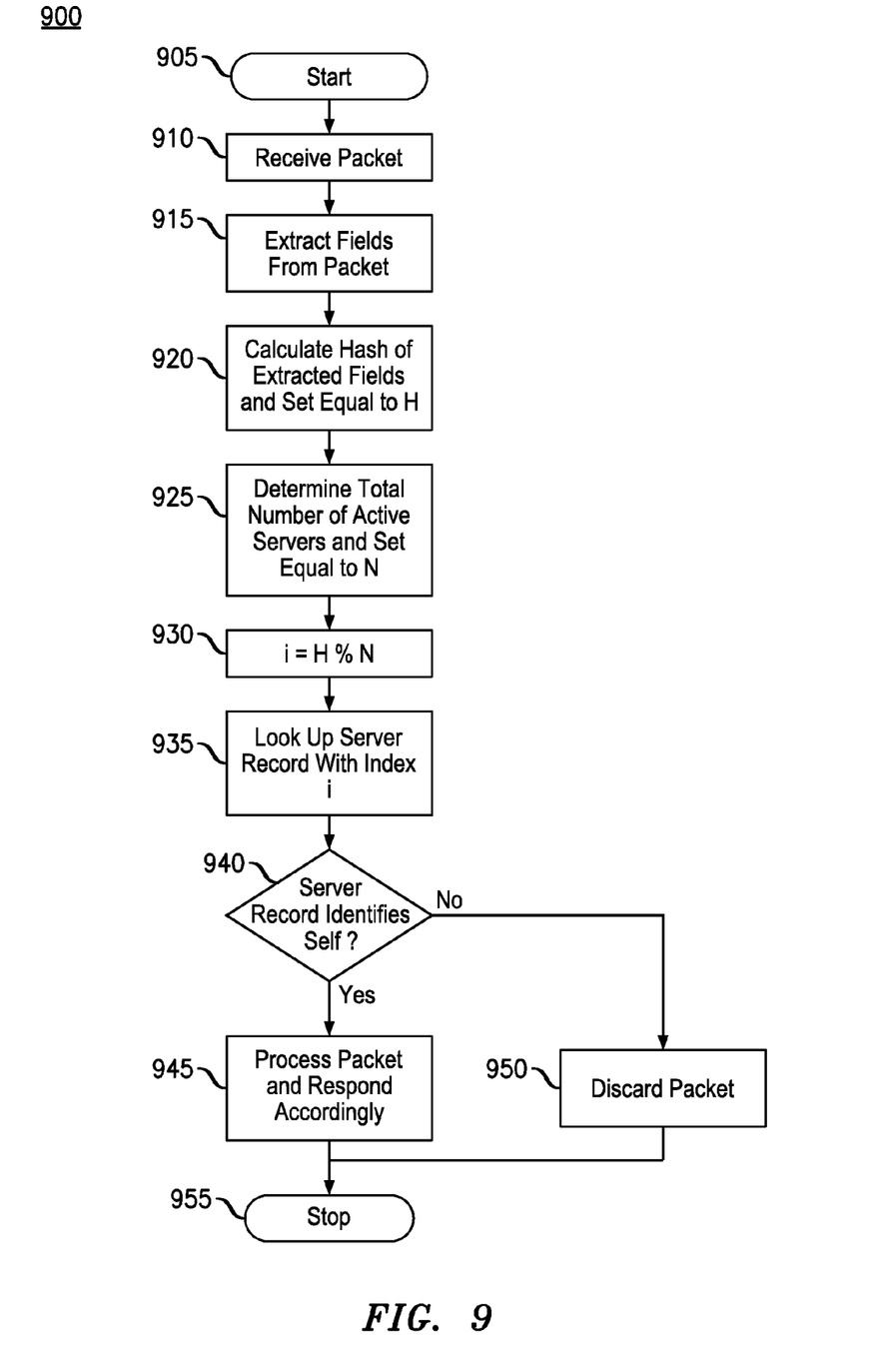
FIG. 9 is a flowchart of an exemplary method for performing load balancing between multiple servers.

FIG. 9 is a flowchart of an exemplary method 900 for performing load balancing between multiple servers. Method 900 may be performed independently by the components of each of the receiving nodes 140*a*, 140*b*, 140*c*, to determine whether to process a received packet and respond accordingly.

Method 900 may start in step 905 and proceed to step 910, where the receiving node 140*a*, 140*b*, 140*c* may receive a packet that has been sent to all receiving nodes 140*a*, 140*b*, 140*c*. The receiving node 140*a*, 140*b*, 140*c* may then extract a number of fields and other information from the packet at step 915. The extracted information may include, for example, the source IP address or the type of service request. Method 900 may then proceed to step 920, where the receiving node 140*a*, 140*b*, 140*c* may calculate a hash value from the extracted fields using any method known to those of skill in the art. In step 925, receiving node 140*a*, 140*b*, 140*c* may then determine how many total receiving nodes 140*a*, 140*b*, 140*c* are currently active by, for example, consulting a locally-stored active server list.

Receiving node 140*a*, 14G*b*, 140*c* may then calculate an index value using the hash value and the total number of servers at step 930. For example, receiving node 140*a*, 140*b*, 140*c* may perform a modulo operation on the hash function using the total number of active servers. It should be apparent that in this manner, an index value is obtained having a value between zero and the total number of active servers minus 1, inclusive. Receiving node 140*a*, 140*b*, 140*c* may then, in step 935, access an item in the list of active servers associated with the calculated index.

In step 940, receiving node 140*a*, 140*b*, 140*c* will determine whether the accessed item identifies itself or another receiving node 140*a*, 140*b*, 140*c*. If the receiving node 140*a*, 140*b*, 140*c* determines that the accessed item identifies itself, method 900 may proceed to step 945 where the receiving node 140*a*, 140*b*, 140*c* may process the received packet and respond accordingly. For example, if the received packet was a request for a change of channel in an IPTV system, the receiving node 140*a*, 140*b*, 140*c* may respond by transmitting a new channel to sending node 110. Method 900 may then stop at step 955. If, on the other hand, receiving node 140*a*, 140*b*, 140*c* determines in step 940 that the accessed item identifies a different receiving node 140*a*, 140*b*, 140*c*, it may simply ignore the packet in step 950 and method 900 may then stop in step 955. In should be apparent that, in the manner described above, only one of the receiving nodes 140*a*, 140*b*, 140*c* will process and respond to each received packet.

Having described exemplary components and methods for the operation of exemplary networks 100, 600, an example of the operation of exemplary networks 100, 600 will now be provided with reference to FIGS. 1-9.

The address resolution storage 230 of routing node 130 may be indicated by data arrangement 300. The link aggregation control storage 250 of routing node 130 may be indicated by data arrangements 400, 500. Control node 610 may currently be monitoring the status of receiving nodes 140*a*, 140*b*, 140*c* and transmit a list indicating all receiving nodes 140*a*, 140*b*, 140*c* as currently active to each of the receiving nodes 140*a*, 140*b*, 140*c*. Accordingly, each receiving node 140*a*, 140*b*, 140*c* may currently contain a list of active servers as indicated by data arrangement 700.

The process may begin with sending node 110 transmitting a packet with destination IP address A over communications network 120 inside frame 150*a*. Routing node 130 may receive the packet inside frame 150*b*. Address resolution module 220 of routing node 130 may then determine that the destination IP address of the packet is A. By accessing record 340 in address resolution storage, address resolution module 220 may determine that IP address A is associated with MAC address U. The packet may then be passed to link aggregation module 240 which may determine that MAC address U is associated with a PLAG. By accessing PLAG record 530 contained in link aggregation control storage 250, link aggregation module 240 may determine that PLAG U contains CLAG U, CLAG W, and CLAG Z.

Link aggregation module 240 may then access CLAG record 430 and determine that interface addresses U and V are contained by CLAG U. Link aggregation module 240 may then select interface address U and transmit the packet in frame 150*c* to receiving node A 140*a* via interface 260*u*. Moving on to CLAG W, link aggregation module may access CLAG record 440 and select interface address Y from the resulting list of three interface addresses associated with CLAG W. Link aggregation module 240 may then transmit the packet in frame 150*d* to receiving node B 140*b* via interface 260*y*. Finally, link aggregation module may access record 450, select interface address Z from the list of interface addresses associated with CLAG Z, and transmit the packet in frame 150*e* to receiving node C 140*c* via interface 260*z*.

After receiving the packet, each receiving node 140*a*, 140*b*, 140*c* may determine whether to respond to the packet by first extracting the source IP address and the request type from the packet. For example, the source IP address may be D and the type of request may be a request for a specific file. Using this information, each receiving node 140*a*, 140*b*, 140*c* may calculate a hash value from the extracted values, such as, for example, "0x4F31." Each receiving node 140*a*, 140*b*, 140*c* may then determine how many servers are currently active by, for example, counting the number of records in data arrangement 700. In this example, the total number of active servers is three. Each receiving server may then obtain a calculated index of two by performing a modulo operation on the hash value using the total number of active servers, three.

Each receiving node may then retrieve server record 750, i.e. the server record having an index of two. Receiving node A and B 140a, 140b may both determine that this server record does not identify themselves and thus may simply discard the packet. Receiving node C 140c, on the other hand, may recognize this server record as identifying itself and create a response packet addressed to IP address D. Receiving node C 140c may then transmit the response packet to sending node 100 within frame 220.

According to the foregoing, various exemplary embodiments provide for balancing server load between multiple servers in a manner that is virtually invisible to clients. In particular, by implementing a Parent Link Aggregation Group including multiple Child Link Aggregation Groups, any packet can be forwarded at Layer 2 to multiple servers at the end of each CLAG. Further, by implementing a selection algorithm across all of the servers, the servers can quickly and efficiently determine one server that should process the packet.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a network node (e.g. router or switch). Thus, a machine-readable storage medium may include read-only memory (ROM), random-access memory (RAM), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of routing packets in a communications network by a network node, the method comprising:
    establishing, at the network node, a first Child Link Aggregation Group (CLAG), wherein the first CLAG includes at least one link to a first downstream node;
    establishing, at the network node, a second CLAG, wherein the second CLAG includes at least one link to a second downstream node;
    establishing, at the network node, a Parent Link Aggregation Group (PLAG), wherein the PLAG includes the first CLAG and the second CLAG;
    receiving, at the network node, a packet including an address of a destination of the packet;
    determining that the destination of the packet is associated with the PLAG; and
    transmitting the packet to both the first downstream node and the second downstream node over the first CLAG and the second CLAG individually.

2. The method, of claim 1, wherein the packet is a unicast packet.

3. The method of claim 1, further comprising:
    associating a Layer 2 address with the PLAG;
    associating an address of the first downstream node with the Layer 2 address; and
    associating an address of the second downstream node with the Layer 2 address,
    wherein the step of determining that the destination of the packet is associated with the PLAG comprises determining that the address of the destination of the packet is associated with the Layer 2 address.

4. The method of claim 3, wherein:
    the steps of associating the address of the first downstream node and associating the address of the second downstream node with the Layer 2 address both comprise modifying an Address Resolution Protocol (ARP) table; and
    the step of determining that the address of the destination of the packet is associated with the Layer 2 address comprises reading an entry of the ARP table, the entry being associated with the address of the destination of the packet.

5. The method of claim 1, wherein the step of transmitting the packet over both the first CLAG and the second CLAG comprises:
    selecting a first chosen link of the at least one link included in the first CLAG;
    selecting a second chosen link of the at least one link included in the second CLAG;
    constructing a first frame that includes the packet and an address associated with the first chosen link;
    constructing a second frame that includes the packet and an address associated with the second chosen link;
    forwarding the first frame to the first downstream node over the first chosen link; and
    forwarding the second frame to the second downstream node over the second chosen link.

6. The method of claim 1, further comprising:
    at the first downstream node:
        receiving a list of all downstream nodes that receive frames via the PLAG,
        determining a total number of downstream nodes from the list,
        receiving the first frame from the network node,
        deriving a piece of information from the first frame,
        performing a mathematical operation on the piece of information using the total number of downstream nodes to obtain a result index,
        determining whether the result index corresponds to the first downstream node,
        responding to the first frame when the result index corresponds to the first downstream node, and
        discarding the first frame when the result index does not correspond to the first downstream node.

7. The method of claim 6, further comprising:
    at the first downstream node, arranging the list of all downstream nodes in an array in increasing order of a node identifier associated with each downstream node,
    wherein the step of determining whether the result index corresponds to the first downstream node comprises:
        reading an element from the array, wherein an index of the element is equal to the result index, and
        determining whether the element includes an identification of the first downstream node.

8. The method of claim 6, wherein the mathematical operation is a modulo operation.

9. The method of claim 6, wherein the step of deriving a piece of information from the frame comprises calculating a hash value from at least one field of the frame.

10. The method of claim 9, wherein the at least one field of the frame includes a source IP address.

11. The method of claim 1, wherein the first downstream node and the second downstream node are both Internet Protocol Television (IPTV) video servers.

12. A network node for routing packets in a communications network, the network node connected to a first downstream node and a second downstream node, the network node comprising:
- an interface that receives a packet, the packet including a destination address;
- a plurality of interfaces, including at least one interface connected to the first downstream node and at least another interface connected to the second downstream node;
- a link aggregation control storage that stores:
  - a first Child Link Aggregation Group (CLAG) record that includes a first CLAG identifier and an indication of the at least one interface of the plurality of interfaces that is connected to the first downstream node,
  - a second CLAG record that includes a second CLAG identifier and an indication of the at least one interface of the plurality of interfaces that is connected to the second downstream node, and
  - a Parent Link Aggregation Group (PLAG) record that includes a PLAG identifier, the first CLAG identifier, and the second CLAG identifier, wherein the PLAG includes the first CLAG and the second CLAG;
- an address resolution module that determines that the destination address of the packet is associated with the PLAG identifier; and
- a link aggregation module that:
  - determines that the PLAG identifier is associated with the first CLAG identifier and the second CLAG identifier by retrieving the PLAG record from the link aggregation control storage,
  - selects a first selected interface from the at least one indication of an interface of the first CLAG record,
  - selects a second selected interface from the at least one indication of an interface of the second CLAG record,
  - forwards the packet to both the first downstream node and the second downstream node over the first selected interface and the second selected interface individually.

13. The network node of claim 12, further comprising:
an address resolution storage that stores:
- a first address resolution record identified by an address of the first downstream node and including the PLAG identifier, and
- a second address resolution record identified by an address of the second downstream node and including the PLAG identifier; and in determining that the destination address of the packet is associated with the PLAG identifier, the address resolution module retrieves an address resolution record identified by the destination address of the packet.

14. The network node of claim 12, wherein the packet is a unicast packet.

15. The network node of claim 12, wherein the first downstream node and the second downstream node are both Internet Protocol Television (IPTV) video servers.

16. A non-transitory machine-readable storage medium that contains instructions for routing packets by a network node in a communications network, the non-transitory machine-readable storage medium comprising:
- instructions for receiving, from a Layer 2 (L2) client, an input frame having an input L2 address as a destination address;
- instructions for determining that the input L2 address is associated with a Parent Link Aggregation Group (PLAG);
- instructions for determining a first Child Link Aggregation Group (CLAG) and a second CLAG associated with the PLAG, wherein the PLAG includes the first CLAG and the second CLAG;
- instructions for determining a first L2 interface associated with the first CLAG and a second L2 interface associated with the second CLAG;
- instructions for extracting a payload from the input frame;
- instructions for creating a first outgoing frame and a second outgoing frame, both including the payload extracted from the input frame;
- instructions for passing the first outgoing frame to the first L2 interface; and
- instructions for passing the second outgoing frame to the second L2 interface.

17. The non-transitory machine-readable readable storage medium of claim 16, further comprising:
- instructions for determining a first outgoing L2 address associated with the first L2 interface; and
- instructions for determining a second outgoing L2 address associated with the second L2 interface,
- wherein the first outgoing frame includes the first outgoing L2 address as a destination address and the second outgoing frame includes the second outgoing L2 address as a destination address.

18. The non-transitory machine-readable readable storage medium of claim 17, wherein the first outgoing L2 address is the same as the input L2 address.

19. The non-transitory machine-readable readable storage medium of claim 16, wherein the first L2 interface is one L2 interface of a plurality of L2 interfaces associated with the first CLAG.

20. The non-transitory machine-readable storage medium of claim 16, wherein the input L2 address is a MAC address and the L2 client is a client of a MAC sublayer.

* * * * *